United States Patent
Liotta, Jr. et al.

(10) Patent No.: US 6,264,737 B1
(45) Date of Patent: *Jul. 24, 2001

(54) SUPPORTED CARBONIC ACID ESTERS USEFUL AS SET ACCELERATORS AND THIXOTROPIC AGENTS IN CEMENT

(75) Inventors: Frank J. Liotta, Jr., Collegeville; Steven A. Schwartz, Downington, both of PA (US)

(73) Assignee: Arco Chemical Technolgy, L.P., Greenville, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/332,517

(22) Filed: Jun. 14, 1999

Related U.S. Application Data

(60) Provisional application No. 60/091,992, filed on Jul. 8, 1998.

(51) Int. Cl.[7] ................................................. C04B 24/00
(52) U.S. Cl. ............................ 106/724; 106/810; 106/823
(58) Field of Search ................................... 106/724, 810, 106/823

(56) References Cited

U.S. PATENT DOCUMENTS

| | | | | |
|---|---|---|---|---|
| 4,131,731 | * | 12/1978 | Lai et al. | 528/370 |
| 4,341,905 | * | 7/1982 | Strege . | |
| 4,414,361 | * | 11/1983 | Gaul et al. | 524/702 |
| 4,507,256 | * | 3/1985 | Jackson, Jr. et al. . | |
| 5,076,959 | * | 12/1991 | Barker et al. | 252/350 |
| 5,112,877 | * | 5/1992 | Barker et al. | 521/110 |
| 5,423,123 | * | 6/1995 | Burge et al. | 106/708 |
| 5,453,123 | * | 9/1995 | Burge et al. | 106/708 |
| 5,476,743 | * | 12/1995 | Spiewak et al. . | |
| 5,571,319 | | 11/1996 | Berke et al. | 106/802 |
| 5,622,558 | | 4/1997 | Berke et al. | 106/802 |
| 5,773,165 | * | 6/1998 | Sugeno | 429/197 |
| 5,795,104 | | 8/1998 | Schanze . | |
| 6,008,314 | * | 12/1999 | Collong et al. | 528/123 |

FOREIGN PATENT DOCUMENTS

| | | | |
|---|---|---|---|
| 4108461 | * | 6/1992 | (DE) . |
| 3132008 | * | 10/1999 | (DE) . |
| 48050141 | * | 7/1973 | (JP) . |
| 55-069980 | * | 5/1980 | (JP) . |
| 58-135166 | * | 8/1983 | (JP) . |
| 61-023683 | * | 2/1986 | (JP) . |
| 61-215685 | * | 9/1986 | (JP) . |
| 61-247648 | * | 11/1986 | (JP) . |
| 02098069 | * | 4/1990 | (JP) . |
| 02132119 | * | 5/1990 | (JP) . |
| 04095362 | * | 3/1992 | (JP) . |
| 06150968 | * | 5/1994 | (JP) . |
| 06150969 | * | 5/1994 | (JP) . |
| 07109321 | * | 4/1995 | (JP) . |

OTHER PUBLICATIONS

BE 734149 Dec. 8, 1969 Belgium . . . Sels es Produits Chimiques.*

* cited by examiner

*Primary Examiner*—Paul Marcantoni
(74) *Attorney, Agent, or Firm*—William C. Long

(57) ABSTRACT

Cementitious compositions are prepared using a dry, flowable admixture containing an ester of carbonic acid such as propylene carbonate and a solid, particulate support which is non-reactive toward the ester such as silica fume. Such admixtures accelerate the set and increase the thixotropy of unhardened mixtures containing hydraulic cement and water, yet can be readily handled and stored in stable form until ready to be used.

8 Claims, No Drawings

SUPPORTED CARBONIC ACID ESTERS USEFUL AS SET ACCELERATORS AND THIXOTROPIC AGENTS IN CEMENT

This application claims the benefit of U.S. Provisional Application No. 60/091,992, filed Jul. 8, 1998.

FIELD OF THE INVENTION

The present invention relates to the use of esters of carbonic acid as set accelerators and thixotropic agents in cementitious compositions. More particularly, the invention pertains to dry, flowable cement admixtures wherein such esters are adsorbed on a solid particulate support which is non-reactive toward the ester. The invention also pertains to methods of synergistically increasing the viscosity of a cementitious composition by the addition of both silica fume and a carbonic acid ester.

BACKGROUND OF THE INVENTION

Organic esters of carbonic acid, particularly cyclic alkylene carbonates such as propylene carbonates and ethylene carbonates, are known hydraulic cement set accelerating agents. Such agents decrease the time necessary to harden a cementitious composition comprised of water, hydraulic cement, and other optional components such as aggregate. The use of carbonic acid esters for such purpose is described in detail in JP 58-135166 (Chemical Abstracts, Vol. 100, No. 2, 1983, Abstract No. 11845p), JP 61-247648 (Chemical Abstracts, Vol. 106, No. 22, 1987, Abstract No. 181621d), and U.S. Pat. No. 5,453,123. The last named patent additionally teaches that carbonic acid esters function as thixotropic additives in cementitious compositions. That is, carbonic acid esters have a thixotropic effect if incorporated into a mixture of hydraulic cement and water.

Many carbonic acid esters, however, are liquids or low melting solids which hydrolyze rapidly when placed in contact with water in a highly acidic or basic environment. In many end-use applications such as grout or concrete repair, cement is sold in dry, bagged form and simply mixed with water immediately before use at the construction or repair site. Adding the carbonic acid ester set-accelerating agent together with the water at the time of mixing is technically possible, but not favored because of the problems associated with securing and maintaining a separate supply of the carbonic acid ester and adding the correct dosage to the cementitious composition. Most end-users of bagged cement products are not currently prepared to handle liquid or low-melting organic admixtures. Premixing the carbonic acid ester with the dry cement may also be problematic due to the fact that the cement, which is highly basic in character, may tend to catalyze the premature decomposition of the carbonic acid ester during the time the bagged cement pre-mix is stored (particularly if the pre-mix is exposed to moisture). An alternative method of handling the carbonic acid ester would be in the form of concentrated aqueous solutions or dispersions, which could then be combined with the dry cement and water at the construction site. However, many carbonic acid esters such as propylene carbonate have limited solubility in water. Maintaining stable dispersions of the carbonic acid ester during storage may also be difficult.

SUMMARY OF THE INVENTION

The present invention provides a dry, flowable cement admixture comprised of an ester of carbonic add and a solid particulate support which is non-reactive towards said ester. In a preferred embodiment, the cement admixture is comprised of silica fume and from 1 to 100 parts by weight of a cyclic alkylene carbonate per 100 parts by weight silica fume.

The invention also furnishes a cementitious composition comprised of (a) hydraulic cement (e.g., Portland cement) and (b) the aforedescribed dry, flowable cement admixture. The cementitious composition may additionally be comprised of aggregate (e.g., sand, gravel, crushed stone). When ready to be used, the cementitious composition is mixed with water and applied using conventional techniques. The viscosity of a mixture comprised of hydraulic cement and water is synergistically increased by adding both silica fume and a carbonic acid ester.

A method of accelerating the set of a cementitious composition is also provided by the present invention wherein the aforedescribed dry, flowable cement admixture is admixed with hydraulic cement, water, and (optionally) aggregate to form the cementitious composition, the amount of the cement admixture being effective to reduce the cementitious composition set time obtained in the absence of the cement admixture.

Surprisingly, adsorbing the carbonic acid ester onto a solid particulate support prior to mixing with hydraulic cement and water does not interfere with the ability of the carbonic acid ester to effectively accelerate the curing of the resulting cementitious composition. That is, the carbonic acid ester appears to be readily released from the support when the admixture is mixed with water and cement such that the setting characteristics of the cementitious composition are very similar to those obtained if the ester is added separately from the support. Moreover, the use of such supported admixtures permits stable, set accelerated cement formulations to be packaged and sold in dry, bagged form which need only be mixed with water prior to use at the construction or building site. In addition, certain solid supports, particularly silica fume, have unexpectedly been found to synergistically enhance the thickening characteristics of carbonic acid esters without interfering with the desirable thixotropic effects of such additives.

DETAILED DESCRIPTION OF THE INVENTION

Preferably, the ester of carbonic acid which is contained in the inventive admixture is at least partially soluble in water. The ester may be either a diester of carbonic acid, a monoester of carbonic acid, or a salt of a monoester of carbonic acid. This invention is particularly well-suited for esters or mixtures of esters which are liquids at room temperature or which melt only slightly above room temperature (e.g. having a melting point of 40° C. or less). It has been found that surprisingly high levels of such substances may be incorporated into the cement admixture while maintaining the flowable (e.g., non-clumping) properties of the particulate support.

Preferred esters of carbonic acid are unsubstituted or substituted aliphatic esters, which may have either an open chain or a cyclic structure. Specially preferred esters include cyclic aliphatic diesters such as alkylene carbonates. Specific examples of such preferred cyclic aliphatic diesters include propylene carbonate (4-methyl1,3-dioxolan-2-one), ethylene carbonate (1,3dioxolan-2-one) and mixtures thereof.

The support selected for use in combination with the aforedescribed carbonic acid ester is a solid substance which is in the form of discrete particles. While the precise size, shape or surface area of such particles is not critical, it is preferred to employ a support having a relatively high surface area in order to increase the maximum amount of the carbonic acid ester that can be loaded onto the support. It may also be desirable for the physical properties (e.g., particle size and shape, density) of the support be similar to that of the cement particles with which the cement admixture will eventually be combined.

The support must be non-reactive with the carbonic acid ester during normal storage conditions. That is, the support should not catalyze or otherwise cause decomposition or other reaction of the ester. For this reason, the surface of the support should be essentially neutral, i.e., neither highly acidic nor highly basic. The support should also not bind the carbonic acid ester irreversibly; when the cement admixture is combined with cement and water, the carbonic acid ester must be able to impart the desirable set acceleration and thixotropic effects to the resulting cementitious composition. The support should additionally be selected from among those materials which will not adversely affect any of the desired properties of the cementitious composition such as compressive strength, slump, air entrainment, shrinkage, or the like.

Silica fume is a particularly, desirable substance to employ as at least a portion of the solid, particulate support. An amorphous by-product commercially obtained by conventional silicon and ferrosilicon metal alloy production or by pyrolysis of rice hulls and the like, silica fume is predominantly comprised of silicon dioxide (typically, 86 to 95 percent by weight). Additional information concerning the composition of silica fume is readily available and may be found, for example, in U.S. Pat. Nos. 5,571,319 and 5,622,558 (the teachings of which are incorporated herein by reference in their entirety). It has been unexpectedly discovered that when both silica fume and a carbonic acid ester are present in a cement paste comprised of hydraulic cement and water, the viscosity of the paste is increased much more than would have been expected from the effects of each additive when added by itself. Other suitable supports include materials such as fumed silica, (as well as other silicas) aluminas, clays, vermiculites and the like; as previously noted, the support selected should not be one which reacts with the carbonic acid ester.

The relative ratios of the carbonic acid ester and the solid particulate support may be varied within a wide range, depending upon the amount of ester which is desired in the final cementitious composition, the adsorption capacity of the support (i.e., the maximum amount of ester which can be combined with the support while still maintaining the cement admixture as a dry, flowable material), and the identity of the support and carbonic acid ester. Typically, however, this range will be on the order of from 1 to 100 parts by weight carbonic acid ester per 100 parts by weight support.

The method by which the carbonic acid ester and support are combined is not thought to be particularly critical. For example, these components may be simply combined all at once and physically mixed by means such as stirring, milling, grinding or the like. Alternatively, the ester may be added incrementally to the support while mixing. Dissolving or diluting the ester in a suitable solvent such as water or the like and then applying the ester solution to the support using conventional impregnation techniques may also be practiced. Following such impregnation, the solvent may be removed by drying or simply left in the admixture if the admixture containing the solvent is sufficiently dry that clumping or aggregation is avoided. If the solvent is to be removed by drying, the solvent selected should be one which is more volatile than the carbonic acid ester so that losses of the ester during drying are minimized.

The aforedescribed admixture is added to a mixture which contains a hydraulic cement, wherein the mixture may also contain further components such as water, aggregate and/or other additives. The amount of the inventive admixture relative to hydraulic cement may be readily varied to achieve the desired effect on the set or cure properties of the final cementitious composition. According to a preferred embodiment, the admixture is utilized in such an amount that 0.1 to 10% by weight of the carbonic acid ester is introduced, based on the weight of the hydraulic cement present.

The admixture composition of the present invention may be used with any of the hydraulic cements suitable for construction application, such as ordinary, quick-hardening and moderate heat Portland cements, high alumina cements, blast furnace slag cement and the like. Of these, Portland cements of the ordinary and quick-hardening types are particularly preferred.

Any of the conventional aggregate materials may be used together with the inventive admixture, including, for example, sand, gravel, crushed stone, pebbles, pumice, fired perlite and the like. The type and quantity of aggregate selected will depend on the ultimate end-use of the admixture. For example, if utilized in a grout application, fine sand may be the only aggregate combined with the admixture.

The quantity of water used for setting the cemenfitious composition comprised of the inventive admixture and hydraulic cement can vary within the weight ratios of water to hydraulic cement of from 0.2:1 to 0.7:1, preferably 0.3:1 to 0.6:1.

The cementitious composition may additionally comprise any of the additives known in the cement art. Such additives may be incorporated into the inventive admixture together with the carbonic acid ester (provided the additive does not cause the premature reaction or decomposition of the carbonic acid ester) or added at the same time as the hydraulic cement and/or water using conventional methods. Preferred examples of such additional additives include plasticizers (also known as water-reducing agents), superplasticizers (also known as high range water-reducing agents), set retarding agents, additional thixotroping agents, additional set-accelerating agents, air-entraining agents and mixtures comprising two or more of such additives. Additional additives of these types are well-known in the art and are discussed in more detail in U.S. Pat. No. 5,453,123. (incorporated herein by reference in its entirety). The amounts of such additional additives in the final cemenfitious composition may be in the ranges taught in the aforementioned patent.

According to one embodiment of the invention, the inventive admixture is added to the mixture containing the hydraulic cement, water, and (optionally) aggregate, either in a mixing device, or after the mixing procedure in the conveyor line or pipeline, or at the point the mixture is being poured or applied. In each case, the introduction of the admixture is performed using mixing tubes or other mixing devices to ensure that it is uniformly dispersed throughout the mass of the resulting cementitious composition.

In an alternative embodiment, the admixture is combined with dry hydraulic cement and (optionally) aggregate and the resulting dry mixture maintained in suitable storage containers such as bags until ready to be used. The dry mixture is then removed from the storage containers, mixed with water, and then applied and used as needed for the particular application desired.

The admixtures of the present invention are suitable for use in any number of applications where cementitious compositions are commonly employed, including, for example, mortars and grout used in tile installation and repairs and the like, mortar and concrete used on roofs, walls, and floors, water-proof mortars and water-proof concretes used in building structures, underwater (antiwashout) applications, remote access applications and molding members of buildings. Suitable methods of applying the cementitious compositions include shot-creting, troweling, spraying, filling of formwork or injecting through a caulking gun or the like. Spraying, for example, may be accomplished by means of a dry method, wherein a powdered mixture comprised of cement, aggregate and the inventive admixture is mixed with water at the top of a spray nozzle. Curing of the cementitious composition can be conducted using any known method such as air-drying curing, damp curing, underwater curing, heat-facilitated curing (e.g., steam curing, autoclave curing), or sequential use of different methods.

EXAMPLES

Examples 1–6

To demonstrate the effectiveness of the admixtures of the present invention as thickening, thixotropic and set-accelerating admixtures in cement applications, a series of cement pastes (Examples 1, 3 and 5) were prepared using an admixture comprised of silica fume and ARCONATE HP propylene carbonate (a product of ARCO Chemical Company). The propylene carbonate was wet onto the silica fume using high intensity mixing in a blender. The resulting admixture was then dry-blended with Portland cement before being combined with water. For comparative purposes, another series of cement pastes (Examples 2, 4 and 6) was prepared wherein the propylene carbonate was first diluted in water before being combined with the Portland cement and silica fume. The relative amounts of the components used in parts by weight are shown in Table I.

TABLE I

|  | Example | | | | | |
| --- | --- | --- | --- | --- | --- | --- |
|  | 1 | 2 | 3 | 4 | 5 | 6 |
| Portland Cement, pbw | 60.8 | 60.8 | 57.6 | 57.6 | 54.4 | 54.4 |
| Water, pbw | 33.98 | 33.98 | 33.98 | 33.98 | 33.98 | 33.98 |
| Propylene Carbonate, pbw | 0.83 | 0.96 | 0.96 | 0.96 | 1.06 | 0.96 |
| Silica Fume, pbw | 3.3 | 3.2 | 6.4 | 6.4 | 9.5 | 9.6 |
| Water/(Cement + Silica Fume) | 0.531 | 0.531 | 0.531 | 0.531 | 0.531 | 0.531 |
| Silica Fume/(Cement + Silica Fume) | 0.05 | 0.05 | 0.10 | 0.10 | 0.15 | 0.15 |
| Propylene Carbonate/(Cement + Silica Fume) | 0.013 | 0.015 | 0.015 | 0.015 | 0.017 | 0.015 |

The viscosity of each cement paste was monitored over time at a constant shear rate of 50 per second (measured at 20° C. using a TA Instrument CSL2 with parallel plate geometry and a 1000 micron gap). No significant differences were observed in the flow curves of the cement pastes prepared by the different blending procedures for a given formulation. That is, at a given composition, the flow curve of a cement paste prepared using an admixture of the invention (i.e., propylene carbonate and silica fume in dry precombined form) was remarkably similar to the flow curve of a cement paste prepared using an aqueous solution of propylene carbonate. This result was unexpected, as it was believed that pre-combining the propylene carbonate with the silica fume would affect the thickening, thixotropic and set-accelerating characteristics of the propylene carbonate.

Examples 7–9

These examples demonstrate the combination of propylene carbonate and silica fume has a synergistic effect on the viscosity of a cement paste. That is, although each additive separately increases cement paste viscosity (compare Examples 8 and 9 in Table II with Example 7), a greater than additional increase in viscosity is observed when both are used together (Example 6). Furthermore, silica fume does not interfere with the desired thixotropic effect of the propylene carbonate. The viscosity measurements were made at the times shown on Table II and were measured subsequent to loading the cement paste sample onto rheometer geometry (shear rate=50/sec; temperature=20° C.).

TABLE II

| Example | 6 | 7 | 8 | 9 |
| --- | --- | --- | --- | --- |
| Portland Cement, pbw | 54.4 | 64.0 | 54.4 | 64.0 |
| Water, pbw | 33.98 | 33.98 | 33.98 | 33.98 |
| Propylene Carbonate, pbw | 0.96 | 0 | 0 | 0.96 |
| Silica Fume, pbw | 9.6 | 0 | 9.6 | 0 |
| Water/(Cement + Silica Fume) | 0.531 | 0.531 | 0.531 | 0.531 |
| Silica Fume/(Cement & Silica Fume) | 0.15 | — | 0.15 | — |
| Propylene Carbonate/(Cement & Silica Fume) | 0.015 | — | — | 0.015 |
| Viscosity, Pa s | | | | |
| 5 sec. | 33.5 | 0.36 | 5.9 | 2.3 |
| 10 sec. | 24.8 | 0.31 | 5.4 | 1.6 |
| 20 sec. | 18.4 | 0.29 | 5.1 | 1.3 |
| 50 sec. | 12.6 | 0.26 | 5.1 | 1.5 |

We claim:

1. A dry cementitious composition consisting essentially of (a) hydraulic cement and (b) a dry, flowable cement admixture comprised of an ester of carbonic acid and a solid particulate support which is non-reactive toward said ester, said admixture consisting by weight of 1 to 100 parts of said ester per 100 parts of said support, said composition comprising 0.1 to 10% by weight of said ester based on said hydraulic cement.

2. The cementitious composition of claim 1 wherein the ester is a cyclic alkylene carbonate.

3. A dry cementitious composition consisting essentially of (a) Portland cement, (b) a dry, flowable cement admixture comprised of silica fume and from 1 to 100 parts by weight of cyclic alkylene carbonate per 100 parts by weight silica fume and (c) aggregate, said composition comprising 0.1 to 10% by weight of said carbonate based on said Portland cement.

4. The cementitious composition of claim 3 wherein the cyclic alkylene carbonate is comprised of propylene carbonate.

5. A method of accelerating the set and increasing the thixotropy of a cementitious composition comprising from 1 to 100 parts by weight of a cyclic alkylene carbonate with 100 parts by weight silica fume to form a dry, flowable cement admixture and admixing the dry, flowable cement admixture with a hydraulic cement, aggregate and water to form the cementitious composition.

6. The method of claim 5 wherein the cyclic alkylene carbonate is comprised of propylene carbonate.

7. The method of claim 5 wherein the dry, flowable cement admixture is admixed with the hydraulic cement and aggregate and stored for a period of time prior to being admixed with water.

8. A dry flowable cement admixture consisting essentially of a cyclic alkylene carbonate and a solid particulate support which is non-reactive toward said carbonate and which is selected from the group consisting of silica fume, silicas, aluminas, clays and vermiculites, the weight ratio of said carbonate to said support being 1 to 100 parts of carbonate per 100 parts of support.

* * * * *